United States Patent [19]

Roberts et al.

[11] Patent Number: 4,825,716

[45] Date of Patent: May 2, 1989

[54] SINGLE GIMBAL CONTROL MOMENT GYROSCOPE SKEWED ARRAY MOUNTING ARRANGEMENT

[75] Inventors: Randy D. Roberts; Rodney A. Carter, both of Phoenix; Gary J. Ogden, Glendale, all of Ariz.

[73] Assignee: Honeywell, Inc., Minneapolis, Minn.

[21] Appl. No.: 119,949

[22] Filed: Nov. 13, 1987

[51] Int. Cl.⁴ .............................................. G01C 19/04
[52] U.S. Cl. .................................................... 74/5.34
[58] Field of Search ................ 74/5.34; 244/165, 166; 248/661, 178; 364/434

[56] References Cited

U.S. PATENT DOCUMENTS

| | | | |
|---|---|---|---|
| 3,452,948 | 7/1969 | Kukel et al. | 244/165 |
| 4,071,211 | 1/1978 | Muhlfelder et al. | 244/165 |
| 4,125,017 | 11/1978 | Dhuyvetter et al. | 74/5.34 X |

Primary Examiner—Rodney H. Bonck
Attorney, Agent, or Firm—Howard Paul Terry

[57] ABSTRACT

A gyroscope mounting structure for use in a spacecraft attitude control system has ten control moment gyroscopes. The structure has a truss for supporting the gyroscopes. The truss has an axis of symmetry. Five front gyroscopes are axially spaced from five rear gyroscopes along the axis of symmetry. The front gyroscopes and the rear gyroscopes are peripherally spaced about the axis of symmetry at equal angular spacings. Each gyroscope has a gimbal axis which is disposed at substantially the same acute angle to the axis of symmetry. Each gimbal axis is disposed parallel to an adjacent reference line which passes through a common intersection point on the axis of symmetry. The truss has a front frame, a rear frame and chords connecting the frames. The truss has five front struts interspaced between the five front gyroscopes for support thereof. The truss also has five rear struts interspaced between the five rear gyroscopes for support thereof. The structure is intended to provide ease of access to the gyroscopes and to minimize structure size and weight.

7 Claims, 9 Drawing Sheets

EQUATION 1
$$\vec{H} = \vec{JS}$$

EQUATION 2
$$\vec{T} = \vec{W} \times \vec{H}$$

EQUATION 3
$$\vec{H_A} = \sum_{i=1}^{n} \vec{H_i}, \quad n = \text{NUMBER OF GYROSCOPES}$$

EQUATION 4
$$\vec{T_A} \quad \sum_{i=1}^{n} \vec{T_i}, \quad n = \text{NUMBER OF GYROSCOPES}$$

SINGLE GIMBAL CONTROL MOMENT GYROSCOPE SKEWED ARRAY MOUNTING ARRANGEMENT

The invention relates to a single gimbal control moment gyroscope skewed array mounting structure and arrangement, and in particular to a single gimbal control moment gyroscope skewed array mounting structure and arrangement which has an overall hourglass shape, and which is for use in a spacecraft.

BACKGROUND OF THE INVENTION

A first prior art single gimbal control moment gyroscope skewed array mounting structure includes a support asembly and a plurality of single gimbal control moment gyroscopes, and has an overall pyramidal shape. A gyroscope is disposed in the plane of each face of the pyramidal assembly. A gyroscope gimbal axis is located parallel to a line in the plane of each face of the pyramid, and the line bisects the face of the pyramid and extends from the apex to the base of the assembly. The angle between any side of the pyramid and the base of the pyramid, which is the array skew angle, is constant. Any number of gyroscopes can be used.

One problem with the first prior art mounting structure is that the maximum dimensions and the volume of the structure or array is relatively large, particularly with a large number of gyroscopes. The corresponding overall weight is relatively large in order to maintain a required level of stiffness in the support assembly. This larger overall size adds to the complexity of ground and orbital installation and maintenance operations for the mounting structure in a spacecraft.

A second prior art single gimbal control moment gyroscope skewed array mounting structure includes a support assembly and a plurality of single gimbal control moment gyroscopes, and has the shape of a regular polygon. Two gyroscopes are disposed on each side of the polygon.

One problem with the second prior art single gimbal control moment gyroscope skewed array mounting structure is that it is only useful for arrays with an even number of gyroscopes.

SUMMARY OF THE INVENTION

According to the present invention, a single gimbal control moment gyroscope skewed array mounting structure is provided. This structure comprises, a truss which has an axis of symmetry, a first plurality of gyroscopes peripherally spaced about the axis of symmetry at equal angular spacings, a first plurality of panels or suitable structure supported by the truss and respectively supporting the gyroscopes, a second plurality of gyroscope peripherally spaced about the axis of symmetry at equal angular spacings and being axially spaced from the first plurality of gyroscope, a second plurality of panels or suitable structure supported by the truss and respectively supporting the gyroscopes, each gyroscope of the first and second plurality of gyroscopes having a gimbal axis disposed at substantially the same acute angle to the axis of symmetry, each said gimbal axis being arranged to be parallel to a respective line that substantially passes through a common intersection point on the axis of symmetry, whereby the structure has an overall hourglass shape for ease of access to the gyroscopes in a spacecraft and for minimizing the overall size and weight of the total assembly.

By using the hourglass structure and arrangement, it overcomes the problem of a relatively large and heavy mounting structure by minimizing the overall size and weight, while maintaining a required stiffness and while maintaining required momentum and torque levels. It also permits easier accessability to the gyroscopes.

DESCRIPTION OF THE PREFERRED EMBODIMENTS

Figure 1:
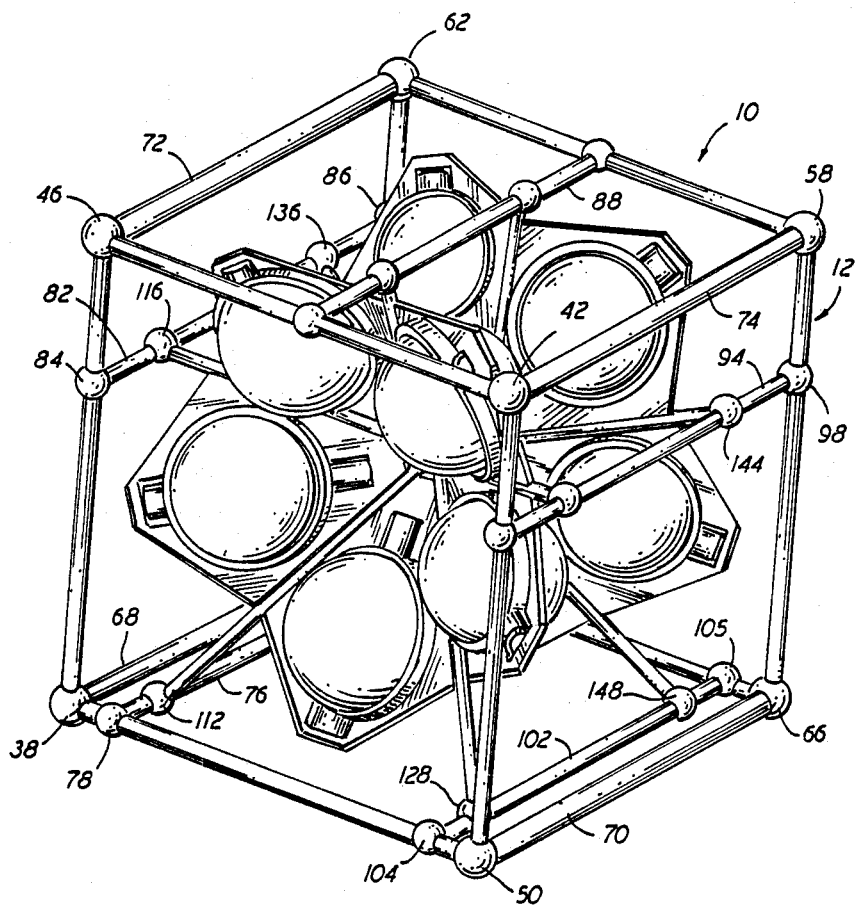
FIG. 1 is a perspective view of a ten gyroscope mounting structure according to the invention.

In FIG. 1, a single gimbal, control moment gyroscope, mounting structure 10 is shown. Structure 10 includes a truss or support assembly 12, which has an axis of symmetry 14. Structure 10 has a plurality of control moment gyroscopes 16, 18, 20, 22, 24, 26, 28, 30, 32, 34, which are mounted on truss 12.

Structure 10 has a unique arrangement of parts of truss 10 and has a unique arrangement of front gyroscopes 16, 18, 20, 22, 24 and rear gyroscopes 26, 28, 30, 32, 34, as explained hereafter. Front gyroscopes 16, 18, 20, 22, 24 and rear gyroscopes 26, 28, 30, 32, 34 are peripherally spaced about axis 14.

Structure 10 is also called a momentum exchange system and a spacecraft attitude control assembly. Front gyroscopes 16, 18, 20, 22, 24 are axially spaced from rear gyroscopes 26, 28, 30, 32, 34 along axis 14.

Figure 3:
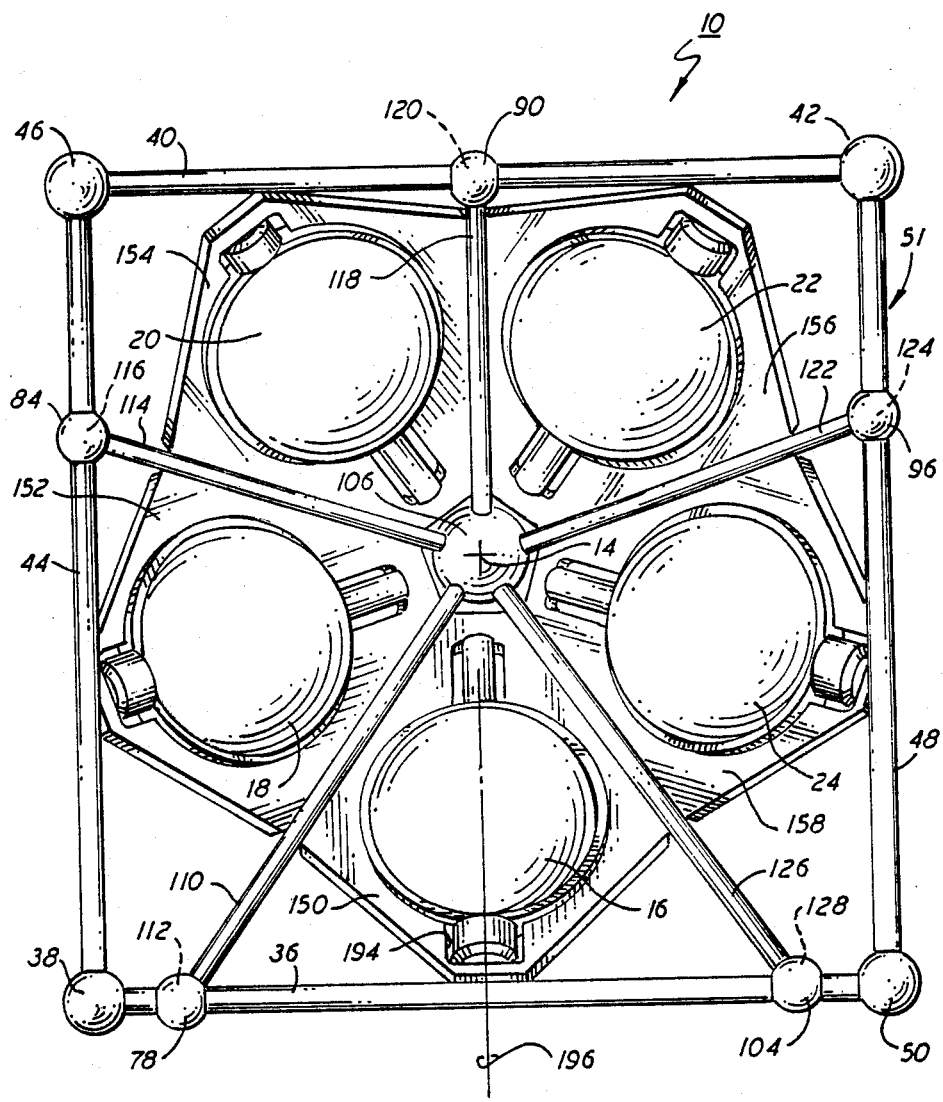
FIG. 3 is a front elevation view as taken along the line 3—3 of FIG. 2.

In FIG. 3, truss 12 includes a front end, bottom member 36 which has a node or connector 38 and a front end, top member 40 which has a connector 42. Truss 12 also includes a front end, left side vertical 44 which has a connector 46, and a front end, right side vertical 48 which has a connector 50. Members 36, 40, 44, 48 form a front frame 51.

Figure 4:
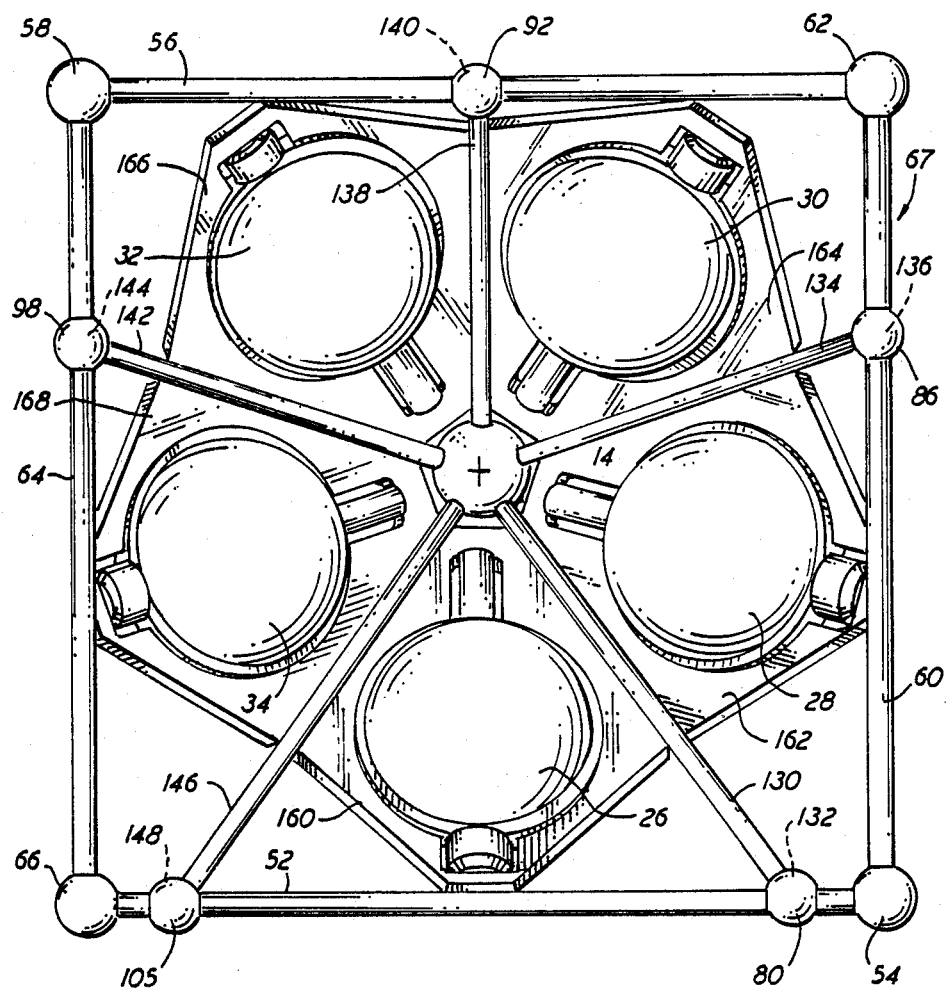
FIG. 4 is a rear elevation view as taken along the line 4—4 of FIG. 2.
Figure 5:
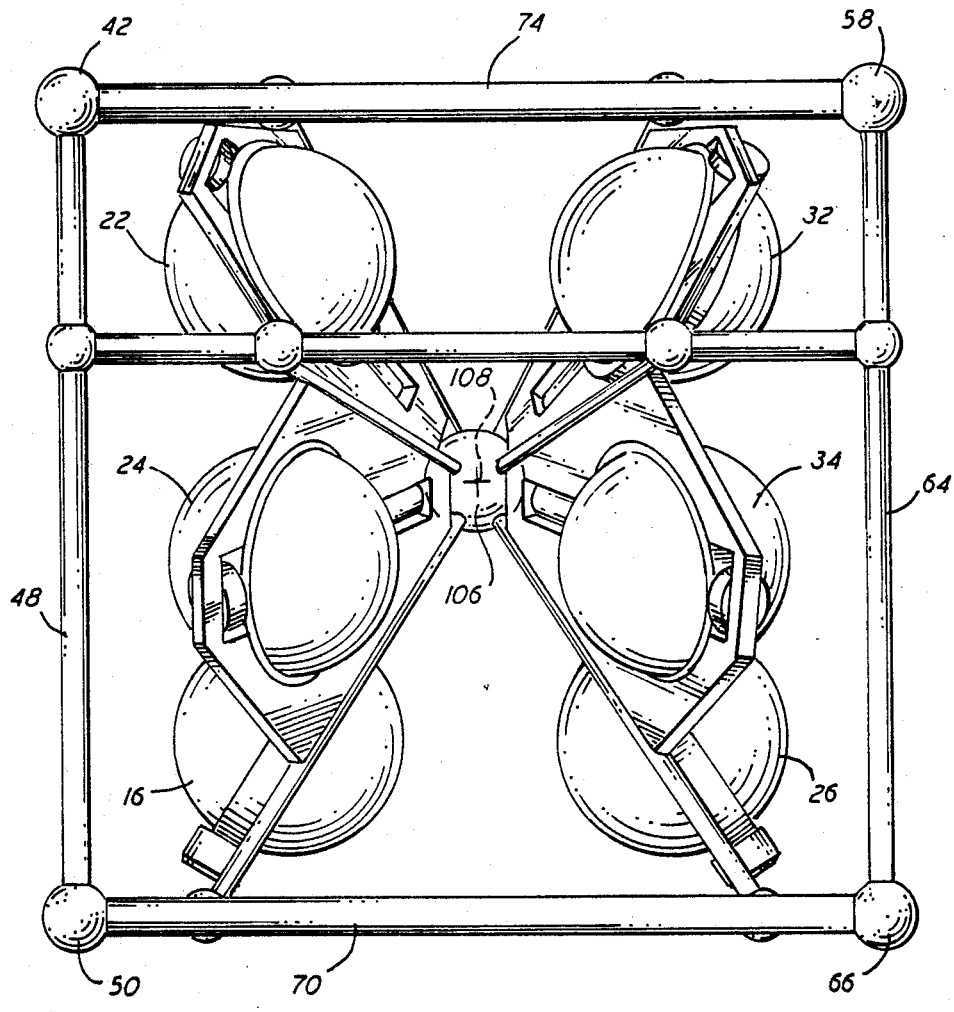
FIG. 5 is a right side elevation view as taken along the line 5—5 of FIG. 2.

In FIG. 4, truss 12 includes a rear end, bottom member 52 which has a connector 54, and a rear end, top member 56 which has a connector 58. Truss also includes a rear end, left side vertical 60 which has a connector 62, and a rear end, right side vertical 64 which has a connector 66. Members 52, 56, 60, 64 form a rear frame 67.

In FIG. 1, truss 12 includes a bottom left side chord 68, a bottom right side chord 70, a top left side chord 72, and a top right side chord 74. Chords 68, 70 72, 74 extend from the front frame 51 to the rear frame 67.

In FIG. 1, truss 12 includes bottom intermediate member 76 which has connectors 78, 80, and left side intermediate member 82 which has connectors 85, 86, and top intermediate member 88 which has connectors 90, 92. Truss 12 also includes right side intermediate member 94 which has connectors 96, 98, and bottom intermediate member 102 which has connectors 104, 106.

Figure 2:
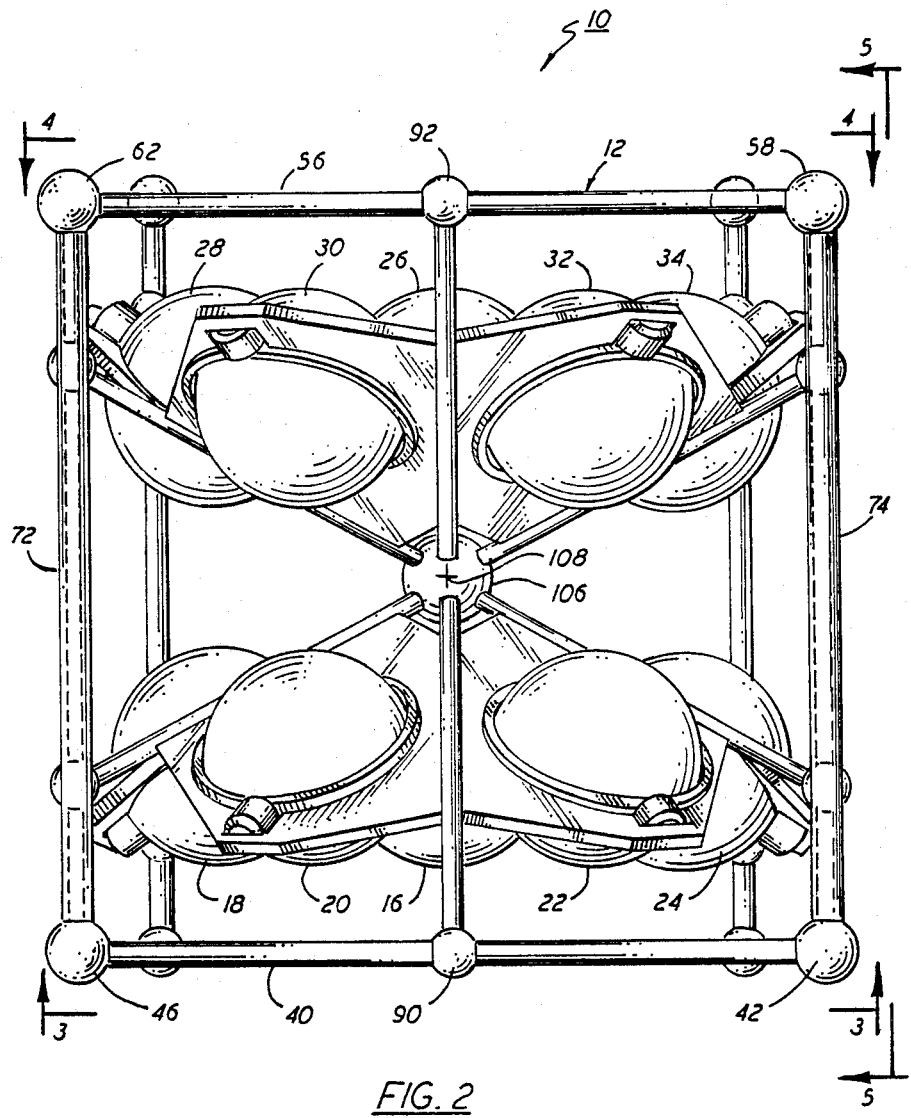
FIG. 2 is a top view of the mounting structure of FIG. 1.

In FIGS. 2 and 3, truss 12 has a central node 106 which has a common intersection point 108. Truss 12 has a front, bottom left strut 110 which has a connector 112, and has a front left side strut 114 which has a connector 116, and has a front top strut 118 which has a connector 120. Truss 12 also has a front right side strut 122 which has a connector 124, and has a front bottom right strut 126 which has a connector 128.

In FIG. 4, truss 12 has a rear bottom left strut 130 which has a connector 132, and has a rear left side strut 134 which has a connector 136, and has a rear top strut 138 which has a connector 140. Truss 12 also has a rear right-side strut 142, which has a connector 144, and has a rear bottom right strut 146 which has a connector 148.

Each of the front and rear struts has an axis, which substantially passes through the common intersection point 108. Each of the front and rear gimbals have a gimbal axis, which is parallel to a line, that bisects the axes of the two adjoining struts, and that substantially passes through the common intersection point 108.

Front gyroscopes 16, 18, 20, 22, 24 are fixedly connected to respective front panels 150, 152, 154, 156, 158. Rear gyroscopes 26, 28, 30, 32, 34 have respective rear panels 160, 162, 164, 166, 168, and are fixedly connected thereto.

Figure 6:
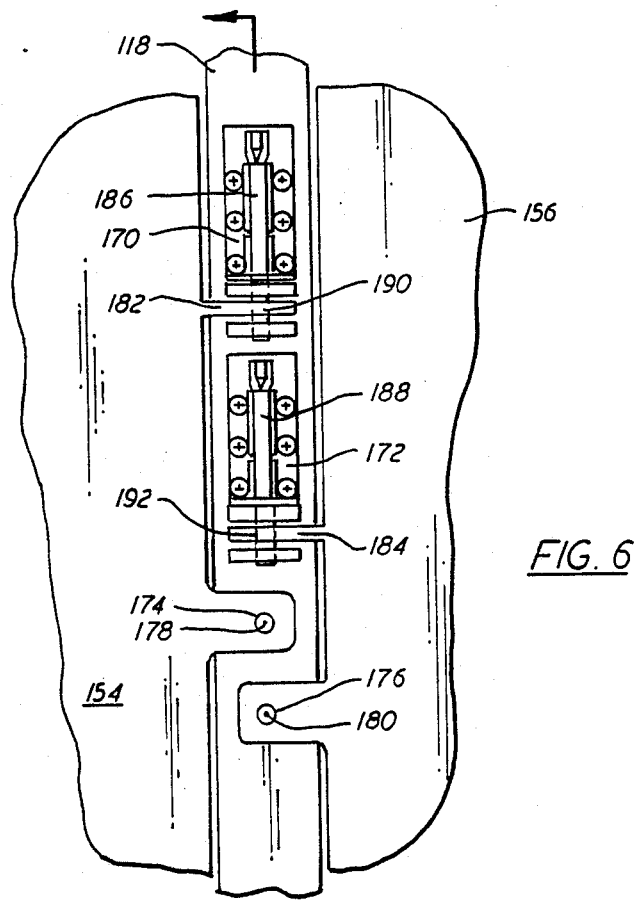
FIG. 6 is an enlarged view of a portion of FIG. 3.

In FIGS. 3 and 6, front panels 154, 156, which are typical panels, have respective latch mechanisms 170, 172 and have respective alignment holes 174, 176. Strut 118, which is a typical strut, has alignment pins 178, 180 which fit into corresponding holes 174, 176. Latches 170, 172 are mounted on strut 118. Panels 154, 156 have respective extensions 182, 184 which engage respective latches 170, 172. Latches 170, 172 have respective lock bars 186, 188, which are received in respective holes in extensions 182, 184. Lock bars 186, 188 are each movable from a locked or closed position to an open position, and back again to a closed position. Holes 190, 192 are round.

In FIG. 3, front panel 150, which is a typical panel, has an opening or cut-out 194, that receives gyroscope 16. Gyroscope 16, which is a typical gyroscope, has a gimbal axis 196, that is parallel to a line that substantially intersects the common intersection point 108 on axis 14, and normal to its rotor gimbal axis.

Each of the front struts 110, 114, 118, 122, 126, and the rear struts 130, 134, 138, 142, 146, has an axis, which substantially passes through the common intersection point 108. The axes of each pair of adjacent struts are bisected by a respective reference line near the axially inner face of the adjacent panel. The gimbal axis of the gyroscope between the pair of struts is substantially parallel to the reference line.

Referring to FIGS. 1, 2, 3, 4 and 5, the invention uses ten, single gimbal control moment gyroscopes 16, 18, 20, 22, 24, 26, 28, 30, 32, 34 to form the hourglass, skewed array arrangement. The gyroscopes are attached to interface panels 150, 152, 154, 156, 158, 160, 162, 164, 166, 168 through pillow blocks or other rigid connecting means. The interface panels are attached to struts 110, 114, 118, 122, 126, 130, 134, 138, 142, 146 with latches 170, 172. The struts are connected to a central node 106 and to other nodes 112, 116, 120, 124, 128, 132, 136, 140, 144, 148 on the enclosing structure. Each pair of properly positioned struts define a plane that, in combination with other planes, establish the geometric relationship of the array. The external structure is made pu of nodes connecting the truss elements 36, 40, 44, 48, 52, 60, 64, 68, 70, 72, 74, 76, 82, 88, 94, 100 such that a rectangular truss structure 12 is formed.

Referring to FIGS. 1, 2, 3, 4 and 5, the arrangement of structure 10 divides the ten gyroscopes 16, 18, 20, 22, 24, and 26, 28, 30, 32, 34 into two groups of five, with each group arranged in the classical pyramid form and the two pyramids connected at their apex.

Figures 8, 9:
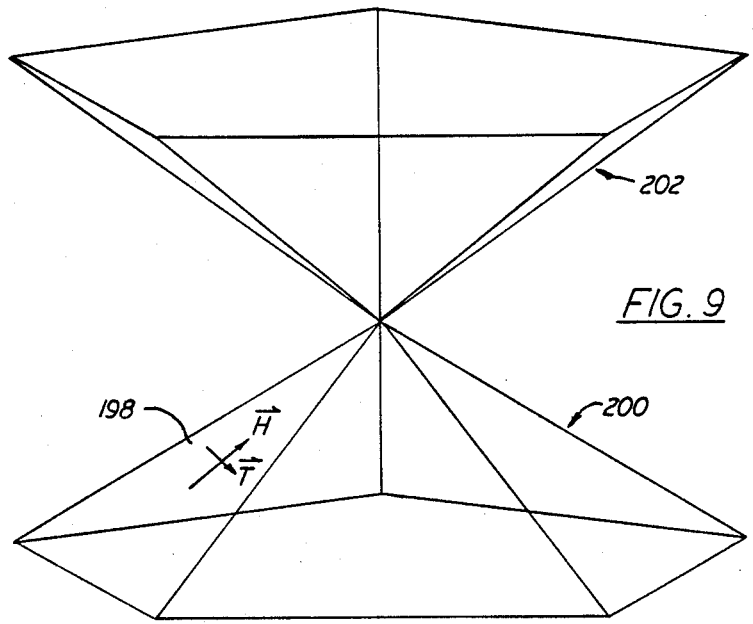
FIG. 8 is a list of mathematical equations which define torque and moment of the typical gyroscope as shown in FIG. 7.
FIG. 9 is a sketch of the concept of the planes of momentum and torque of the gyroscopes of the mounting structure of FIG. 1.

Referring to FIGS. 2 and 9, the effective momentum and torque planes of action for each group of five gyroscopes are shown to form a regular pyramid, with the apex of upper pyramid 202 coincident with the apex of lower pyramid 200. Note that the triangular shape of the sides does not represent the shape of the performance envelope of an individual gyroscope.

Figure 7:
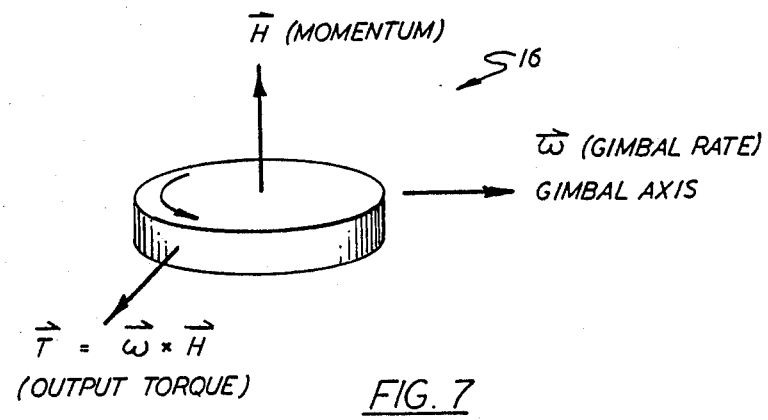
FIG. 7 is a schematic representation of a typical one of the single gimbal control moment gyroscopes shown in FIG. 3.

In operation, with reference to FIGS. 7 and 8, gyroscope 16, 18, 20, 22, 24, 26, 28, 30, 32, 34 are used to stabilize or change spacecraft attitude by exchanging angular momentum with a spacecraft or vehicle. To perform this function, the gyroscopes are generally very large in comparison to instrument gyroscopes, ranging up to several feet in length with weights of several hundred pounds.

Referring to FIG. 7, the typical single gimbal control moment gyroscope 16 can be represented by a spinning disk or rotor producing angular momentum $\overline{H}$ that can be rotated at an angular rate $\overline{\omega}$ about a gimbal axis normal to the direction of $\overline{H}$. Referring to FIG. 8, the vector angular momentum $\overline{H}$ is defined by equation 1 as the product of the vector rotor speed $\overline{S}$ and the scalar polar mass moment of inertia J of the rotor. Assuming constant rotor speed, equation 2 states that rotation of the rotor about the gimbal axis at a rate $\overline{\omega}$ produces a torque $\overline{T}$ equal to the vector cross product of gimbal rate $\overline{\omega}$ and angular momentum $\overline{H}$. Thus, the momentum $\overline{H}$ and torque $\overline{T}$ are mutually orthogonal and lie in the plane produced by a full rotation of the momentum vector about the gimbal axis. If the gyroscope 16 is mounted to a spacecraft, the torque $\overline{T}$ produced by rotating the gimbal acts to accelerate the vehicle in such a way that the net change in vehicle momentum is equal and opposite to the change in gyroscope momentum, satisfying the law of conservation of momentum.

Referring to FIGS. 8 and 9, the single gimbal control moment gyroscopes 16, 18, 20, 22, 24, 26, 28, 30, 32, 34, can produce a three dimensional envelope of momentum and torque, permitting full, three-axis control of the vehicle. The array momentum $\overline{H}_A$ and array torque $\overline{T}_A$ at any given time is simply the vector sum of the momentum and torque from each gyroscope as defined in equations 3 and 4 of FIG. 8. By applying appropriate commands to each of the gyroscopes in an array, momentum can be exchanged along any desired axis to change angular attitude or rate or compensate for external disturbances on a spacecraft. The arrangements used for the gyroscopes are symmetrical to minimize degradation of performance envelopes in the event any of the devices fail. This also permits any of the devices to act as a dormant spare to improve overall probability of success.

FIG. 8 shows the equations or physical relationships of a typical or basic control moment gyroscope 16.

FIG. 9 shows the momentum and torque plane geometry or conceptual layout for the structure 10 which has ten gyroscopes. In FIG. 9, a lower pyramid 200 and an upper pyramid 202 are shown. The vector of momentum $\overline{H}$ and the vector of torque $\overline{T}$ are shown in one plane of action 198, which is a typical plane of action.

Figure 10:
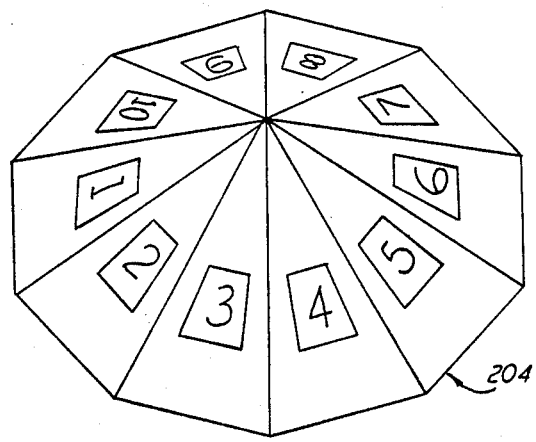
FIG. 10 is a sketch of the concept of a modified prior art pyramidal mounting structure.
Figure 12:
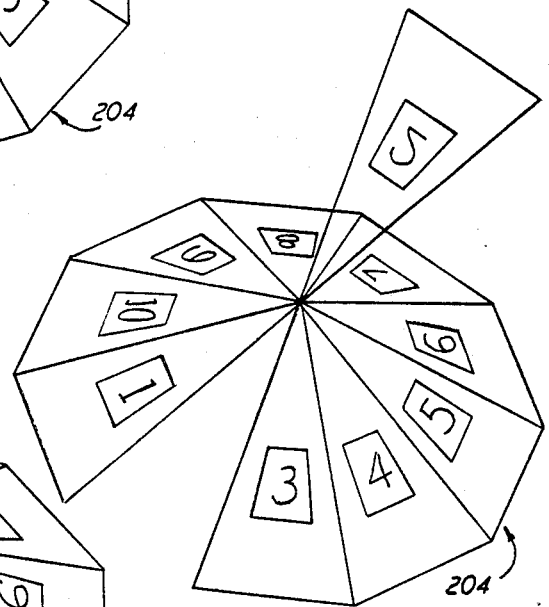
FIG. 12 is a sketch of a modification of the concept of the mounting structure of FIG. 11.
Figure 11:
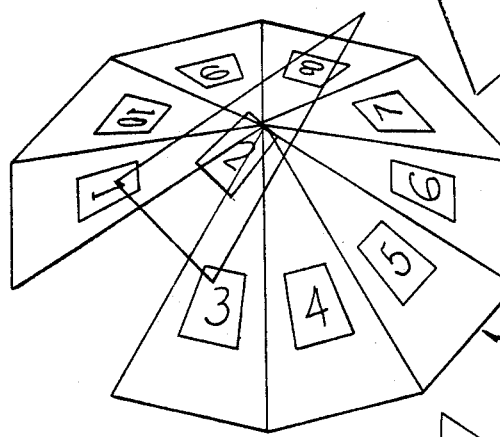
FIG. 11 is a sketch of a modification of the concept of the mounting structure of FIG. 10.
Figure 13:
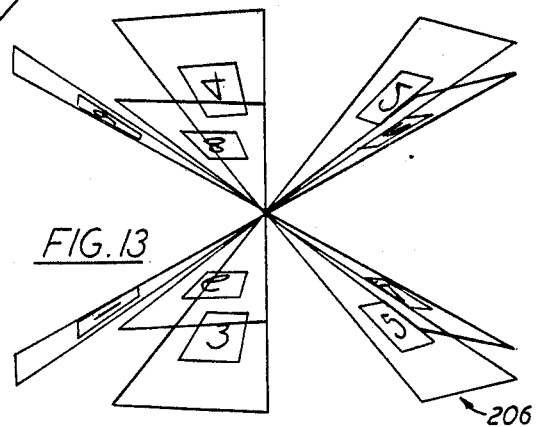
FIG. 13 is a sketch of a modification of the concept of the mounting structure of FIG. 12 and is also a sketch of the concept of the mounting structure of FIG. 1.

In FIGS. 10, 11, 12 and 13, the differences between structure 10 and a modified prior art unit is shown. One characteristic of a single gimbal control moment gyroscope is it can be translated in any direction or rotated 180 degrees about any axis normal to the gimbal axis without affecting its contribution to array performance. By noting this, it can be shown that the performance envelope of FIG. 9 is identical to that of a modified, prior art, ten-sided regular pyramid 204 with ten planes 1, 2, 3, 4, 5, 6, 7, 8, 9, 10, and with the same skew angle. FIG. 10 shows momentum and torque plane relationship for a ten-sided, pyramid array. FIG. 11 shows plane number 2 being translated out of the original arrangement across the apex of the pyramid 204. The translation occurs along a line lying in and bisecting the plane. In FIG. 12, the plane has been translated completely across the apex of pyramid 204 and then rotated 180 degrees. Since this is consistent with the characteristics stated above, the total array performance envelopes have not been changed. The result of repeating this process for each of the even numbered planes is shown in FIG. 13, with the five translated and rotated even numbered planes on top and the five odd numbered planes in their original positions on the bottom. By extending the planes laterally to fill the empty spaces, the relationship of FIG. 9 is duplicated. Thus, the hourglass arrangement or structure 206 according to the invention is developed by moving gyroscopes out of the basic pyramid form in a manner that does not alter the array envelopes.

There are a number of advantages to structure 10 as explained hereafter.

One advantage of the invention is a reduction in maximum array length. Referring to FIG. 3, the gyroscopes in each group of five are positioned as close as practical to the central node 106 while allowing for adequate operating clearances. For typical skew angles and gyroscope quantities, the maximum array dimension across the base of the prior art pyramid is significantly greater than any dimension across the hourglass arrangement 10. As gyroscope quantity increases, the percentage reduction in array length of structure 10 as compared to the prior art pyramid and polygon units increases.

The second advantage of the invention is reduced overall volume. Referring to FIGS. 2 and 3, it can be seen that the hourglass arrangement permits all gyroscopes to be positioned closely to a common point; in this case, the central node 106. This reduces the average distance between any one gyroscope and the others in the array, resulting in less total array volume required per gyroscope. As with the maximum array length, this advantage becomes greater as the number of gyroscopes increases.

The third advantage of the invention is reduced overall weight, which is a direct result of the lower array dimensions and volume. Efficient operation of a typical single gimbal control moment gyroscope requires that the supporting structure have a relatively high bending stiffness to minimize rotor rotation about the torque output axis. To maintain a given stiffness, the sectional properties of a structural element must be increased as its length increases. This results in an increase in weight per unit length in addition to the increase associated with the added length alone. It follows that, for a specified stiffness, the shorter length and lower volume of the invention will require less structural weight.

The fourth advantage of the invention is an overall improvement in the ease of access to the gyroscopes for ground and orbital installation and maintenance. Referring to FIG. 3, all five front gyroscopes of the group shown are readily accessible from one direction. The five rear gyroscopes in the other group are similarly accessible from the opposite direction, resulting in availability of all gyroscopes from only two directions. In contrast, because of the relatively large spacing between gyroscopes, large arrays in the prior art pyramid configuration require a separate access direction for each device. The prior art polygon arrangement is better, but will still generally require one access direction for each pair of gyroscopes.

The fifth advantage of the invention is that the invention is valid for any odd or even number of gyroscopes greater than or equal to three in an array. A ten gyroscope configuration has been shown and described in FIGS. 1 through 5. The variation shown in FIGS. 14, 15 and 16, incorporate six gyroscopes into the hourglass arrangement.

Figure 14:
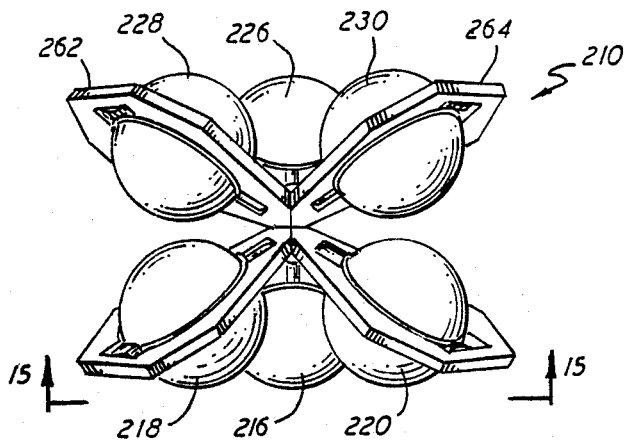
FIG. 14 is a top view of an alternate embodiment of the mounting structure according to the invention.
Figure 15:
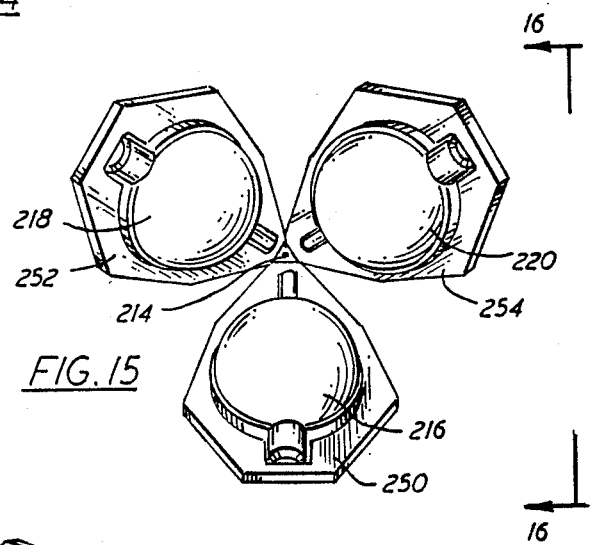
FIG. 15 is a front elevation view as taken along th line 15—15 of FIG. 14.
Figure 16:
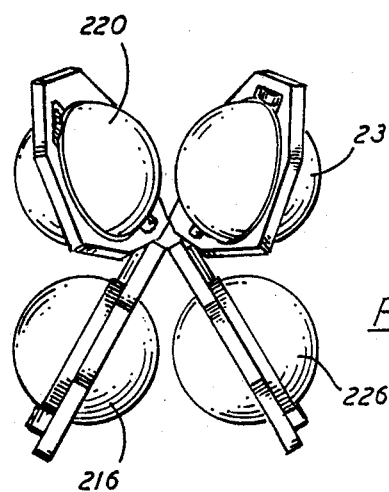
FIG. 16 is a right side elevation view as taken along the line 16—16 of FIG. 15.

In FIGS. 14, 15 and 16, an alternate, six-gyroscope, mounting structure 210 is shown. The truss assembly is not shown for each of illustration. Structure 10, which has a longitudinal axis 214, includes three front gyroscopes 216, 218, 220 and three rear gyroscopes 226, 228, 230. Front gyroscopes 216, 218, 220 have respective front panels 250, 252, 254. Rear gyroscopes 226, 228, 230 have respective rear panels 260, 262, 264.

In this alternate embodiment of FIGS. 14, 15 and 16, structure 210 has six gyroscopes 216, 218, 220, 226, 228, 230, which have an hourglass arrangement.

This embodiment can be shown to have the same performance envelopes as a six-sided pyramidal mounting structure by following the same sequence presented in FIGS. 10, 11, 12, and 13 for the mounting structure of FIG. 1.

Other alternate mounting structures incorporating a minimum of three gyroscopes, with no maximum limit, can be developed according to the present invention. For odd numbers of gyroscopes, the total symmetry shown in FIG. 1 is not present as the sum of rear gyroscopes will be one less than the front. Equivalence to the pyramidal mounting structure is still shown using the methods of FIGS. 10, 11, 12, and 13.

In addition to a truss support assembly, alternate methods of properly positioning and securing the gyroscopes, including but not limited to welded, bolted or riveted plates or a combination truss and plate assembly, can be used.

While the invention has been described in its preferred embodiment, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A gyroscope mounting structure comprising:
    a truss which has an axis of symmetry;
    a first plurality of front gyroscopes peripherally spaced about the axis of symmetry;
    a first plurality of front panels supported by the truss and respectively supporting the gyroscopes;
    a second plurality of rear gyroscopes peripherally spaced about the axis of symmetry;
    a second plurality of rear panels supported by the truss and respectively supporting the gyroscopes;
    said first plurality of front gyroscopes being axially spaced from the second plurality of gyroscopes along the axis of symmetry;
    each gyroscope of the first plurality of front gyroscopes and the second plurality of rear gyroscopes having a gimbal axis disposed at substantially the same acute angle to the axis of symmetry;
    each said gimbal axis being arranged to be parallel to a respective adjacent reference line which passes through a common intersection point on the axis of symmetry,
    whereby the structure has an hourglass shape for ease of access to the gyroscopes and for minimizing the size and weight of the structure.

2. The structure of claim 1, wherein said truss includes:
    a front frame and a rear frame coaxial along the axis of symmetry with the rear frame being axially spaced from the front frame;
    a plurality of intermediate members connecting the frames;
    a plurality of front struts interspaced between the front gyroscopes for supporting the front panels and being supported by the intermediate members; and
    a plurality of rear struts interspaced between the rear gyroscopes for supporting the rear panels and being supported by the intermediate members.

3. The structure of claim 2, wherein
    each strut has a plurality of latch mechanisms for connecting the panel on each side thereof and adjacent thereto to the strut, each latch mechanisms having a lock bar for engaging an extension on the adjacent panel.

4. The structure of claim 2, including
    a central node having a center substantially coinciding with the common intersection point,
    said central node connecting to each of said front struts and rear struts.

5. The structure of claim 2, wherein
    the respective reference line adjacent each said gimbal axis of each said gyroscope is disposed between a pair of adjacent struts,
    the pair of adjacent struts having respective axes substantially passing through the common intersection point, and
    the reference line being arranged to bisect an angle between the axes of the pair of adjacent struts and being disposed to pass through the common intersection point.

6. The structure of claim 1, wherein
    each panel has an opening for receiving its supported gyroscope; and
    each panel has connection means for fixedly connecting the gyroscope to the panel.

7. A gyroscope mounting structure comprising:
    a primary support structure which has an axis of symmetry;
    a first plurality of front gyroscopes peripherally spaced about the axis of symmetry;
    a first plurality of front support members supported by the primary support structure and respectively supporting the front gyroscopes;
    a second plurality of rear gyroscopes peripherally spaced about the axis of symmetry;
    a second plurality of rear support members supported by the primary support structure and respectively supporting the rear gyroscopes;
    said first plurality of front gyroscopes being axially spaced from the second plurality of gyroscopes along the axis of symmetry;
    each gyroscope of the first plurality of front gyroscopes and the second plurality of rear gyroscopes having a gimbal axis disposed at substantially the same acute angle to the axis of symmetry;
    each said gimbal axis being arranged to be parallel to a respective adjacent reference line which passes through a common intersection point on the axis of symmetry;
    whereby the gyroscope mounting structure has an hourglass shape for ease of access to the gyroscopes and for minimizing the size and weight of the gyroscope mounting structure.

* * * * *